United States Patent
Kerman

(10) Patent No.: US 10,275,718 B2
(45) Date of Patent: Apr. 30, 2019

(54) PARAMAGNETIC TREE COUPLING OF SPIN QUBITS

(71) Applicant: Massachusetts Institute of Technology, Cambridge, MA (US)

(72) Inventor: Andrew J. Kerman, Arlington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 15/354,286

(22) Filed: Nov. 17, 2016

(65) Prior Publication Data

US 2017/0140296 A1 May 18, 2017

Related U.S. Application Data

(60) Provisional application No. 62/256,200, filed on Nov. 17, 2015.

(51) Int. Cl.
*G06N 99/00* (2019.01)
*G06N 10/00* (2019.01)
*B82Y 10/00* (2011.01)

(52) U.S. Cl.
CPC .............. *G06N 10/00* (2019.01); *B82Y 10/00* (2013.01)

(58) Field of Classification Search
CPC .......... G01R 33/3815; G01R 33/34023; G01R 33/035; G01R 33/0354; G06N 99/002; B82Y 10/00; H01F 6/008; H01F 6/00; H01F 41/048; H01F 6/003; H03K 19/195; H03K 3/38; H03K 17/92; H01L 39/223; H01L 39/2493; H01L 39/22; H01L 49/006; H01L 39/025; H01L 39/16; H01L 39/045; Y10T 29/49014

See application file for complete search history.

(56) References Cited

U.S. PATENT DOCUMENTS

| | | | |
|---|---|---|---|
| 4,621,203 | A | 11/1986 | Sweeny |
| 5,768,297 | A | 6/1998 | Shor |
| 5,942,997 | A | 8/1999 | Silver et al. |
| 6,627,915 | B1 | 9/2003 | Ustinov et al. |
| 6,734,699 | B1 | 5/2004 | Herr et al. |
| 8,018,244 | B2 | 9/2011 | Berkley |

(Continued)

FOREIGN PATENT DOCUMENTS

CN 103227800 A 7/2013

OTHER PUBLICATIONS

T. Filippov, et al., "Tunable Transformer for Qubits Based on Flux States", IEEE Transactions on Applied Superconductivity, vol. 13, No. 2, Jun. 2003.*

Kerman et al., "High-Fidelity Quantum Operations on Superconducting Qubits in the Presence of Noise;" Physical Review Letters, PRL 101, 070501; Aug. 15, 2008; 4 Pages.

(Continued)

*Primary Examiner* — Seokjin Kim
(74) *Attorney, Agent, or Firm* — Daly, Crowley, Mofford & Durkee LLP

(57) ABSTRACT

Described herein are structures and techniques for highly-connected qubit interaction using a "paramagnetic tree coupling" scheme. In one embodiment, a structure for providing highly-connected qubit interaction includes a plurality of qubits and, for each of the plurality of qubits, a paramagnetic medium connecting the qubit to each other one of the plurality of qubits, where the paramagnetic medium includes a series of inductive couplers.

15 Claims, 9 Drawing Sheets

(56) References Cited

U.S. PATENT DOCUMENTS

| | | | |
|---|---|---|---|
| 8,174,305 | B2 | 5/2012 | Harris |
| 8,179,133 | B1 | 5/2012 | Kornev et al. |
| 8,854,074 | B2 | 10/2014 | Berkley |
| 9,812,836 | B1 | 11/2017 | Osborn |
| 2004/0012407 | A1 | 1/2004 | Amin et al. |
| 2004/0095803 | A1 | 5/2004 | Ustinov |
| 2004/0135139 | A1 | 7/2004 | Koval et al. |
| 2005/0273306 | A1* | 12/2005 | Hilton ............... B82Y 10/00 703/11 |
| 2006/0147154 | A1* | 7/2006 | Thom ............... B82Y 10/00 385/37 |
| 2006/0225165 | A1 | 10/2006 | Maassen van den Brink et al. |
| 2007/0241747 | A1 | 10/2007 | Morley et al. |
| 2008/0274898 | A1* | 11/2008 | Johnson ............ B82Y 10/00 505/190 |
| 2009/0182542 | A9 | 7/2009 | Hilton et al. |
| 2009/0321720 | A1 | 12/2009 | Rose |
| 2010/0194466 | A1 | 8/2010 | Yorozu et al. |
| 2011/0018612 | A1 | 1/2011 | Harris |
| 2011/0065586 | A1* | 3/2011 | Maibaum ........... B82Y 10/00 505/170 |
| 2012/0071333 | A1 | 3/2012 | Kauffman et al. |
| 2014/0097405 | A1* | 4/2014 | Bunyk ............... G06N 99/002 257/31 |
| 2015/0032994 | A1* | 1/2015 | Chudak ............. G06N 99/002 712/42 |
| 2015/0111754 | A1 | 4/2015 | Harris et al. |
| 2015/0310350 | A1 | 10/2015 | Niskanen et al. |
| 2016/0335560 | A1 | 11/2016 | Mohseni et al. |
| 2017/0140296 | A1 | 5/2017 | Kerman |
| 2017/0177534 | A1* | 6/2017 | Mohseni ............ H03K 19/195 |
| 2018/0218279 | A1* | 8/2018 | Lechner ............ G06N 99/002 |

OTHER PUBLICATIONS

PCT International Search Report and Written Opinion dated Jan. 31, 2017 for International Application No. PCT/US2016/062456; 10 Pages.

Andrew J. Kerman; QEO Overview; PowerPoint Presentation Presented on Jun. 28, 2015 at the QEO Satellite Meeting of the Fourth Conference in Adiabatic Quantum Computing (AQC 2015); 11 Pages.

Andrew J. Kerman et al., "IARPA Quantum Enhanced Optimization (QEO) Study;" Presented on Oct. 26, 2015 and Jan. 20, 2016 at the IARPA BAA QEO Proposer's Days Briefings; 33 Pages.

PCT International Search Report and Written Opinion dated Jan. 19, 2017 for International Application No. PCT/US2016/062461; 8 Pages.

Wendin et al., "Superconducting Quantum Circuits, Qubits and Computing;" Retrieved from the Internet https://arxiv.org/pdf/cond-mat/0508729.pdf; Feb. 2, 2008; 60 Pages.

Courtland; "Google Aims for Quantum Computing Supremacy;" Spectrum.IEEE.Org; North America; Jun. 2017; 2 pages.

PCT International Preliminary Report on Patentability dated May 31, 2018 for International Application No. PCT/US2016/062456; 6 Pages.

PCT International Preliminary Report on Patentability dated May 31, 2018 for International Application No. PCT/US2016/062461; 7 Pages.

Office Action for U.S. Appl. No. 15/354,275 dated May 11, 2018; 16 pages.

U.S. Appl. No. 15/976,291, May 10, 2018, Kerman.

Response to Office Action dated May 11, 2018 for U.S. Appl. No. 15/354;275, filed Jul. 12, 2018, 5 pages.

Notice of Allowance dated Oct. 11, 2018, for U.S. Appl. No. 15/976,291; 15 Pages.

U.S. Non-Final Office Action dated Sep. 24, 2018, for U.S. Appl. No. 15/354,275; 10 Pages.

* cited by examiner

PARAMAGNETIC TREE COUPLING OF SPIN QUBITS

CROSS REFERENCE TO RELATED APPLICATION

This application claims the benefit under 35 U.S.C. § 119(e) of U.S. Provisional Application No. 62/256,200 filed Nov. 17, 2015, which application is incorporated herein by reference in its entirety.

U.S. patent application Ser. No. 15/354,275, entitled MULTILOOP INTERFEROMETERS FOR QUANTUM INFORMATION PROCESSING, filed on even date herewith, and assigned to the assignee of the present application, is incorporated herein by reference in its entirety.

STATEMENT REGARDING FEDERALLY SPONSORED RESEARCH

This invention was made with government support under Contract No. FA8721-05-C-0002 awarded by the U.S. Air Force. The Government has certain rights in the invention.

BACKGROUND

Quantum annealing technology is of interest to government and commercial entities, as it could provide enormous performance improvements in solving hard classical optimization problems such as resource allocation and scheduling, planning, navigation, circuit and network design and validation, and pattern recognition, etc.

An important limitation of existing quantum annealing technology for classical optimization is the limited connectivity of the physical spin qubit hardware. Since each qubit nominally represents a binary variable in the optimization problem to be solved, and the connections made between them encode that problem (in the form of constraints), limited physical hardware connectivity translates to a limited complexity of the optimization problems that can be posed on that hardware. Some existing systems attempt to solve this problem using a technique known as "embedding," in which physical spin qubits with small connectivity are grouped together to form "logical spin qubits" with higher connectivity.

In some existing systems, hardware coupling between spin qubits is engineered using additional "coupler" qubits, with each pairwise 2-spin coupling implemented by a single coupler qubit, inductively coupled to two spins. Making a large number of such direct inductive connections to a single quantum spin is simply not possible due to the small size of the qubits, the corresponding geometrical constraints, and the large inductive loading of the spin that would result. Thus, existing systems can support at most six pairwise connections to each spin.

SUMMARY

It is appreciated herein that the existing logical qubit grouping scheme has several disadvantages. As an example, for general optimization problems, the embedding process itself is an extremely difficult classical optimization problem for which there is no deterministic algorithm, and this difficulty increases exponentially as the physical hardware connectivity is made smaller. As another example, the couplings which enforce agreement between the physical spin constituents (labeled $J_F$ for ferromagnetic) of each logical spin must be kept much larger than the couplings $J_{ij}$ between logical spins (which encode the problem to be solved), to avoid the appearance of unphysical solutions in the form of "kinks" in these spin chains. Given a maximum programmable coupling strength of any physical machine, this amounts to sacrificing a substantial fraction of the dynamic range available for programming the problem. Furthermore, since the number of physical spins required per logical spin tends to grow polynomially with the overall system size, the required ratio between $J_F$ and the logical $J_{ij}$ grows as well causing the available dynamic range to decrease as the size of the problem is increased. As yet another example, the quantum driver terms which are engineered in the system to allow quantum tunneling and enhanced optimization are presently associated with single spins only. As the number of physical spins per logical spin grows, these fluctuations become exponentially less efficient at producing tunneling of the logical spin variables.

In view of the above, it is further appreciated herein that achieving higher hardware connectivity may have a transformative effect on the performance of quantum annealing technology. Accordingly, described herein are structures and techniques to circumvent existing hardware connectivity limitations using a so-called "paramagnetic tree coupling" scheme.

According to one aspect of the disclosure, a structure for providing highly-connected qubit interaction includes a plurality of qubits and, for each of the plurality of qubits, a paramagnetic medium connecting the qubit to each other one of the plurality of qubits, where the paramagnetic medium includes a series of inductive couplers.

In some embodiments, the series of inductive couplers includes five or more couplers. In certain embodiments, the series of inductive couplers includes two or more angle couplers, two or more transfer couplers, and at least one sign coupler. In particular embodiments, the plurality of qubits includes at least 5, 9, or 64 qubits. In some embodiments, every combination of three of the plurality of qubits is interconnected. In certain embodiments, every combination of three of the plurality of qubits is interconnected by a 3-spin sign coupler.

In certain embodiments, the series of couplers includes one or more couplers having two coupler qubits arranged in parallel, wherein each of the two coupler qubits include a flux loop, wherein one of the two coupler qubits has a crossover inside its flux loop. In some embodiments, the plurality of qubits includes N qubits, wherein the series of couplers includes an N-spin sign coupler having a plurality of loops, each loop having a pair of Josephson junctions.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Figure 1:
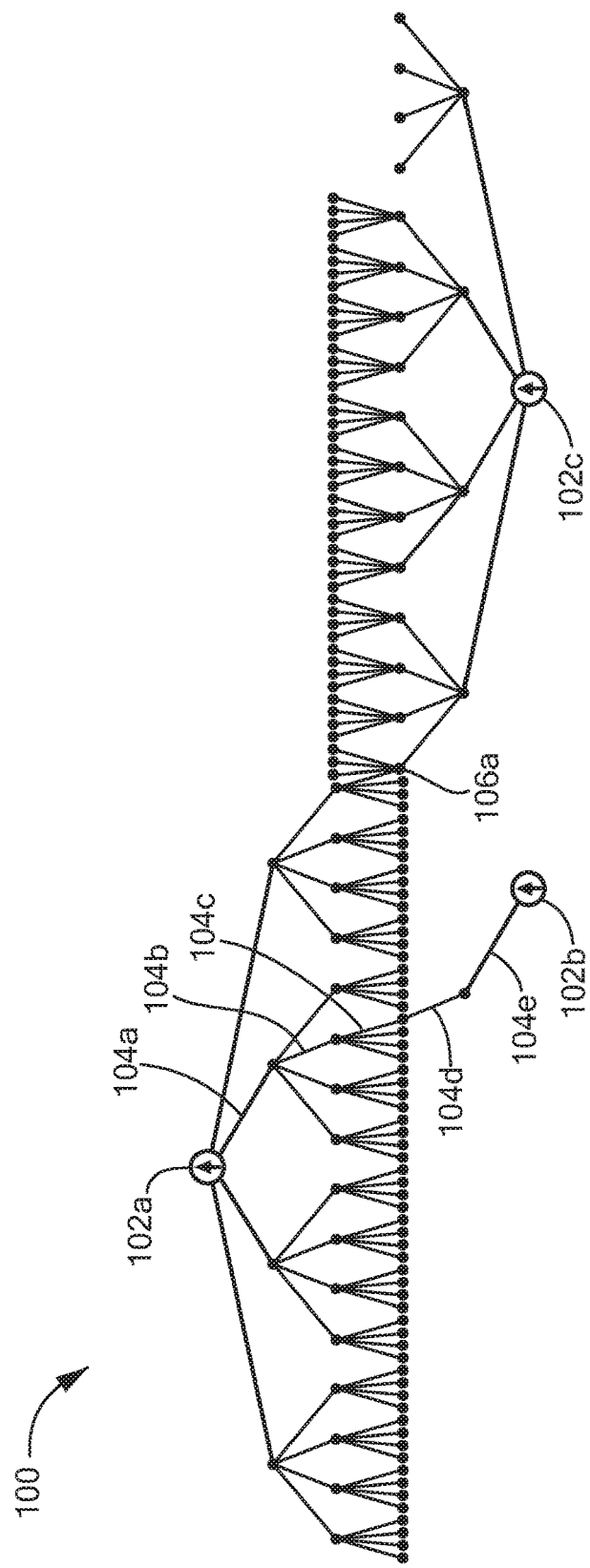
FIG. 1 is a diagram of paramagnetic tree structure to provide pairwise connectivity, in accordance with an embodiment of the disclosure.

Referring to FIG. 1, a structure 100 can provide pairwise connectivity between a plurality of qubits (102 generally), according to some embodiments. The tree-like structure 100 forms a paramagnetic medium in which the qubits (or "spins") 102 are embedded and, thus, is said to provide "paramagnetic tree coupling." It will be appreciated that the paramagnetic tree coupling scheme described herein can achieve higher connectivity per qubit compared to existing techniques. In many embodiments, the qubits 102 are provided as flux qubits each having pairs of Josephson junctions.

Each qubit 102 can be connected to every other qubit 102 via a series of couplers (104 generally). In the embodiment shown, pairs of qubits 102 are connected via a series of five (5) couplers. For example, a first qubit 102a and a second qubit 102b are connected via couplers 104a-104e arranged in series as shown.

In the embodiment of FIG. 1, each qubit 102 is connected to a plurality of couplers (four couplers in FIG. 1), which in turn are connected to another plurality of couplers (also four in FIG. 1), and so on. This results in a tree structure for each qubit 102. For example, as shown in FIG. 1, a first qubit 102a may correspond to the root node of tree having sixty-four (64) leaf nodes, one of which is labeled 106a in FIG. 1. Each of these leaf nodes may be connected to a corresponding tree structure for a different other one of the plurality of qubits 102 such that every qubit is pairwise connected to many other qubits (and, in some cases, to every other qubit in a cluster). Thus, in the example shown, each qubit 102 can have an independently-controllable interaction with sixty-four (64) other qubits.

Figure 2:
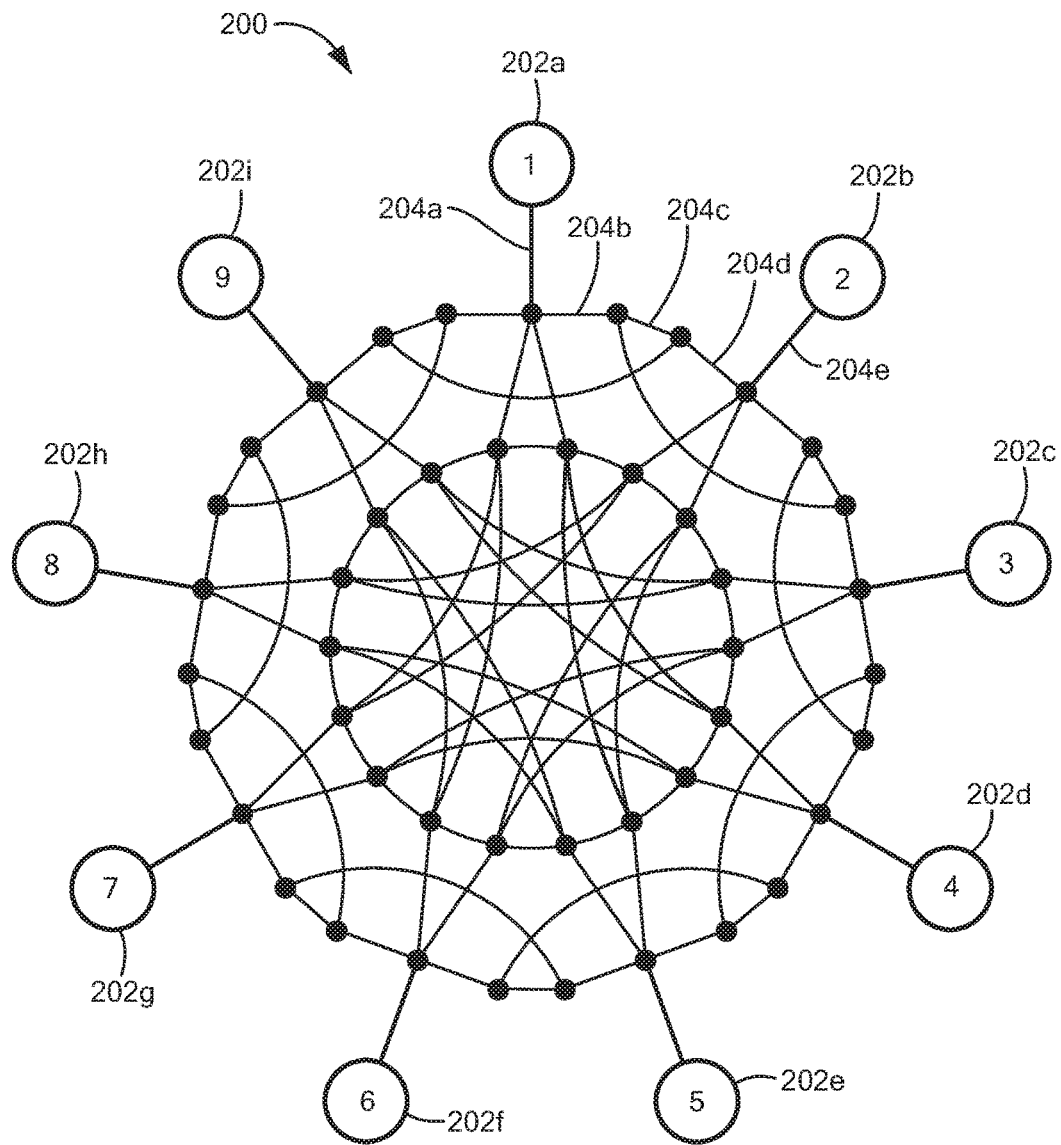
FIG. 2 is a diagram of a paramagnetic tree structure to provide fully-connected pairwise interactions, in accordance with an embodiment of the disclosure.
Figure 5:
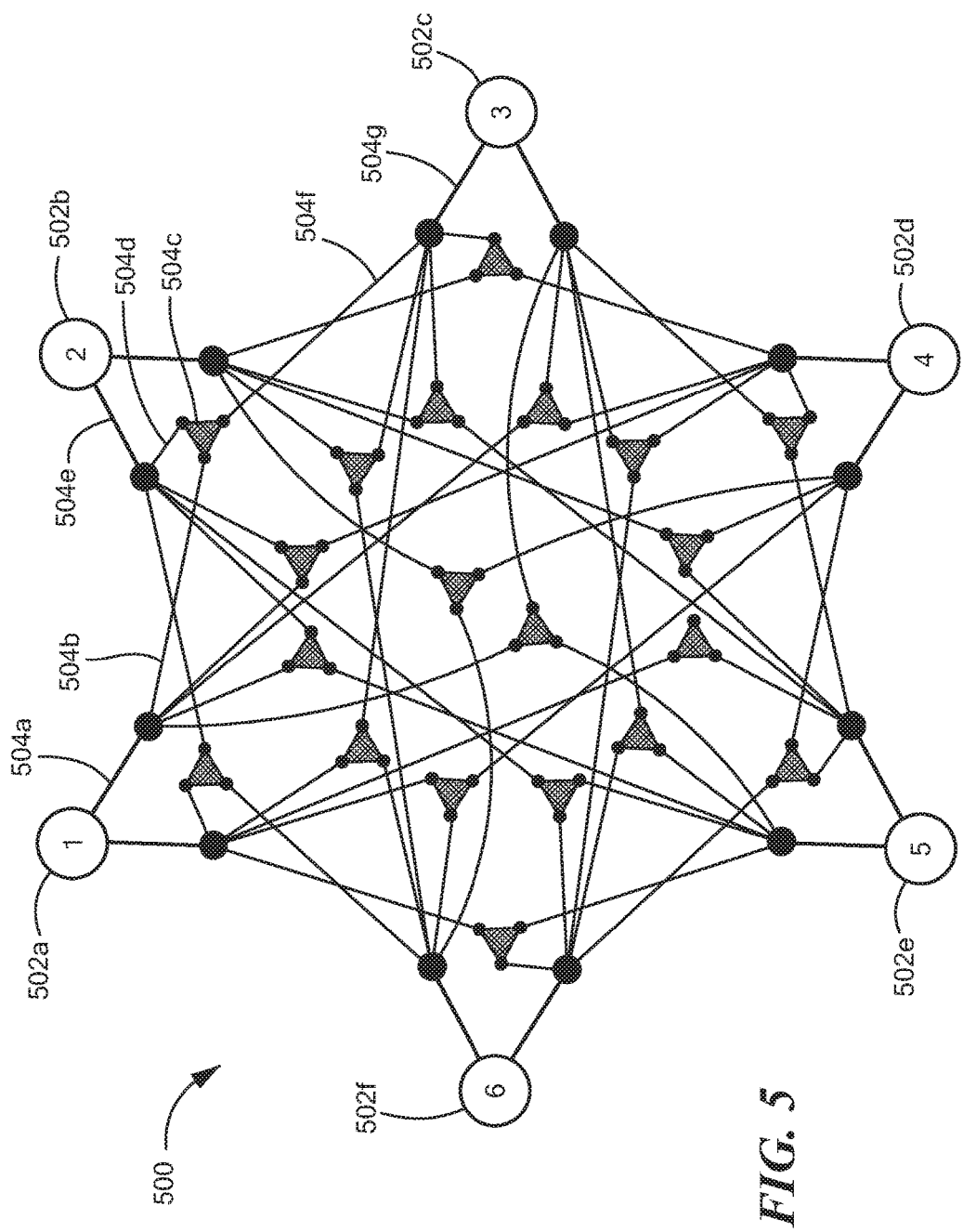
FIG. 5 is a diagram of a paramagnetic tree structure to provide fully-connected 3-spin interactions, in accordance with an embodiment of the disclosure.

It should be understood that only three qubits 102a-102c and only two full qubit tree structures are shown in FIG. 1, with the remaining qubits and tree structure omitted for clarity. Examples of fully connected paramagnetic tree structures are shown in FIGS. 2 and 5 and described below in conjunction therewith.

It will be appreciated that, using the paramagnetic tree scheme described above, each qubit 102 is only directly connected to a small number of couplers, alleviating the geometrical constraints and inductive loading.

Figure 1A:
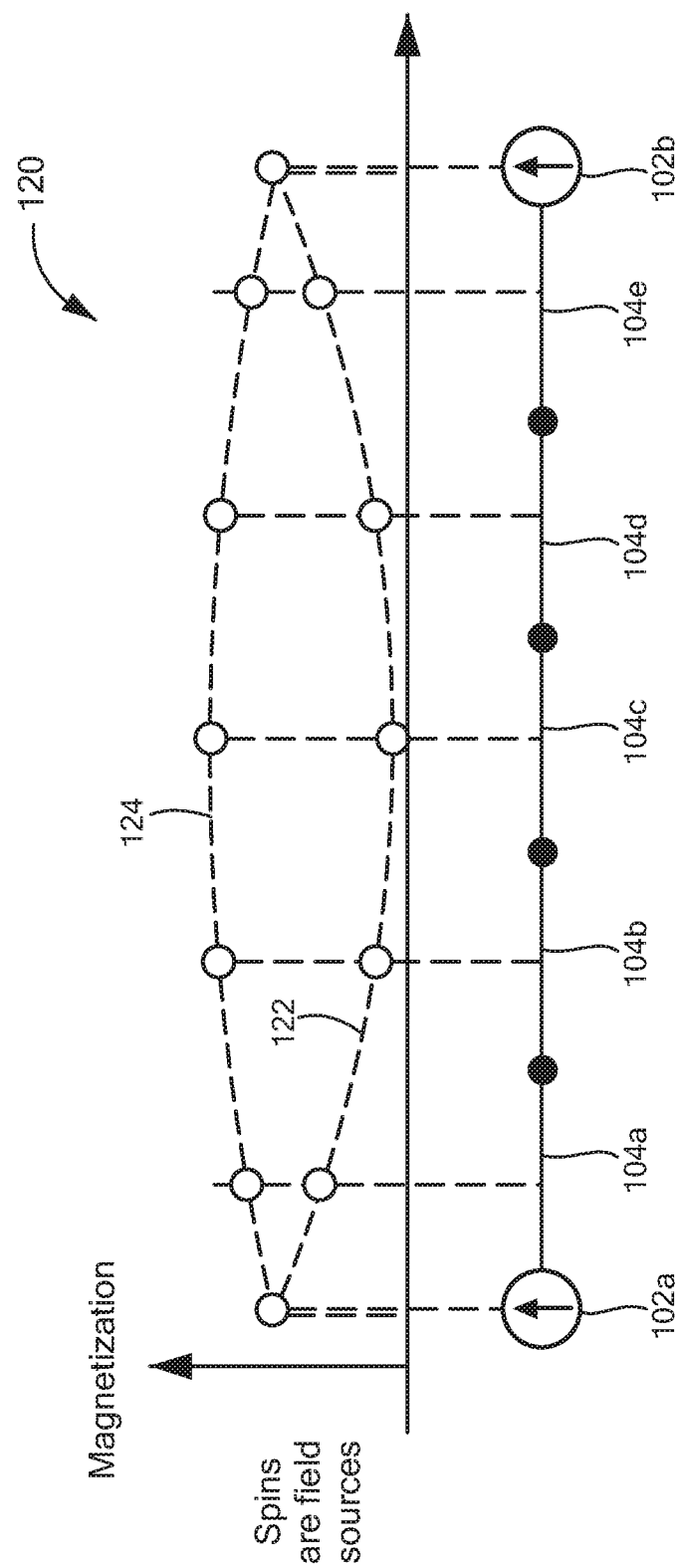
FIG. 1A is a plot illustrating a paramagnetic effect between two qubits, according to some embodiments.

Referring to FIG. 1A, in which like elements of FIG. 1 are shown using like reference designators, the paramagnetic tree couplers 104 may act as inductors which can have either positive, zero, or negative inductance. In many embodiments, couplers 104 may act as tunable inductors, which can be tuned by controlling a flux through a loop of the coupler.

As illustrated by plot 120 in FIG. 1A, the resulting effect is that of a paramagnetic medium, where the qubits 102 act as sources of local magnetization. The coupler "medium" (e.g., couplers 104a-104e) is then magnetized by these sources (e.g., by qubits 102a and 102b), and where the magnetization induced by two spins overlaps, an effective quantum interaction between them results.

In a classical paramagnet, a localized source is screened out over a characteristic length (as illustrated by dashed line 122 in FIG. 1A). In contrast, using the structures disclosed herein, the effective screening length can actually be negative, resulting in a magnetization that increases with distance from the source (e.g., from qubits 102a and 102b, as illustrated by dashed line 124 in FIG. 1A). This property constitutes an effective distributed DC flux amplification, and can be exploited to achieve strong coupling between qubits 102 even if the spins have relatively small intrinsic magnetic moments.

Referring to FIG. 2, a structure 200 can provide a fully connected 9-qubit cluster with 2-spin interactions, according to an embodiment of the disclosure. The structure 200 includes a plurality of qubits 202a-202i (202 generally) connected via couplers (204 generally). In the embodiment shown, each qubit 202 is connected to every other qubit 202 via a series of five (5) couplers. For example, a first qubit 202a may be connected to a second qubit 202b via couplers 204a, 204b, 204c, 204d, and 204e, arranged in series as shown.

Figure 3:
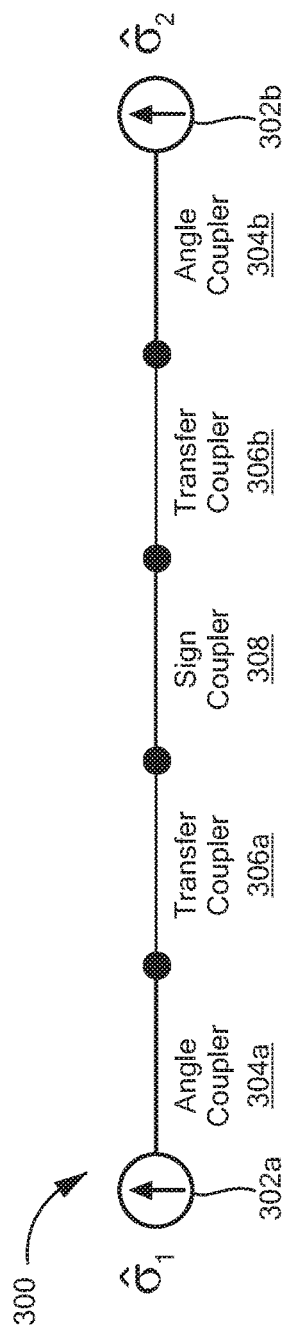
FIG. 3 is a diagram showing a series of couplers to connect a pair of qubits, according to some embodiments.

Referring to FIG. 3, a series of couplers 300 connecting pairs of qubits in a paramagnetic tree structure may include two or more distinct types of couplers, according to some embodiments. The series 300 may be used, for example, within the paramagnetic tree structure 100 of FIG. 1 and/or the paramagnetic tree structure 200 in FIG. 2. In the embodiment shown, qubits 302a and 302b may be coupled via a series of five (5) couplers. The qubits 302a, 302b (302 generally) are connected to respective angle couplers 304a, 304b (304 generally), which are in turn connected to respective transfer couplers 306a, 306b (306 generally), which are connected to each other via a sign coupler 308. In some embodiments, qubits 302, angle couplers 304, transfer couplers 306, and/or sign coupler 308 may be the same as or similar to elements 322, 324, 326, and 328, respectively of FIG. 3A.

Figure 3A:
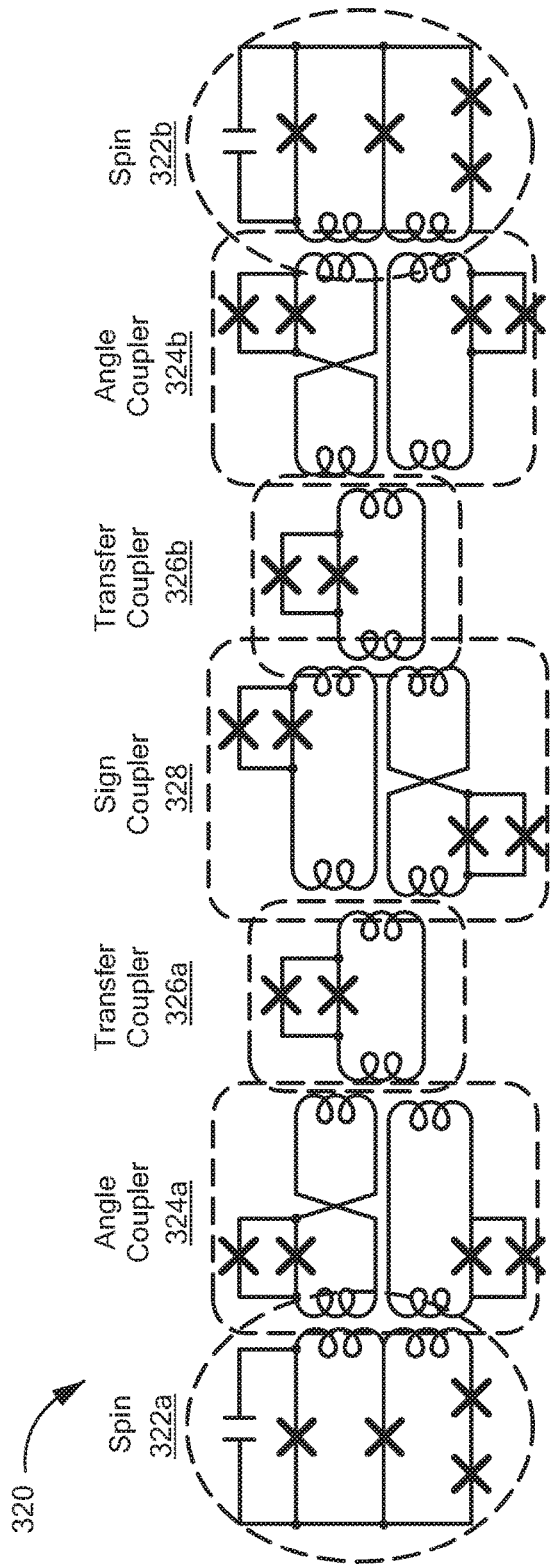
FIG. 3A is a diagram showing a series of couplers to connect a pair of qubits, according to one embodiment.

Referring to FIG. 3A, according to one embodiment, a pair of spins 322a and 322b may be connected by a series of couplers 320 provided from the circuit elements shown. The couplers 320 include angle couplers 324a, 324b (324 generally), transfer couplers 326a, 326b (326 generally), and a sign coupler 328. The sign 328 and angle couplers 324 may each include parallel coupler qubits, with one having a crossover inside its flux loop, that function together as a "push-pull" element. For the sign coupler 328, this scheme may be used to circumvent the fact that individual coupler qubits produce much smaller antiferromagnetic coupling than ferromagnetic coupling. By using a second qubit with a crossover, both qubits can be biased in their intrinsically strong-coupling (ferromagnetic) mode, and operated in parallel, to achieve strong effective coupling of either sign (ferromagnetic or antiferromagnetic). For the angle couplers 324 shown, the two parallel coupler qubits are connected with one to the qubit's Z loop and one to the X loop, allowing dynamic tuning of the effective relative angle of the two spin moments. This allows continuous rotation Ising (ZZ) to transverse (XX) interaction. In the latter case the sign of the XX coupling controls whether the resulting Hamiltonian is stoquastic or non-stoquastic in the computational basis. Non-stoquastic Hamiltonians are believed to have qualitatively greater quantum computational complexity than stoquastic Hamiltonians, and have not been implemented in any form to date in quantum annealing hardware.

Figure 4:
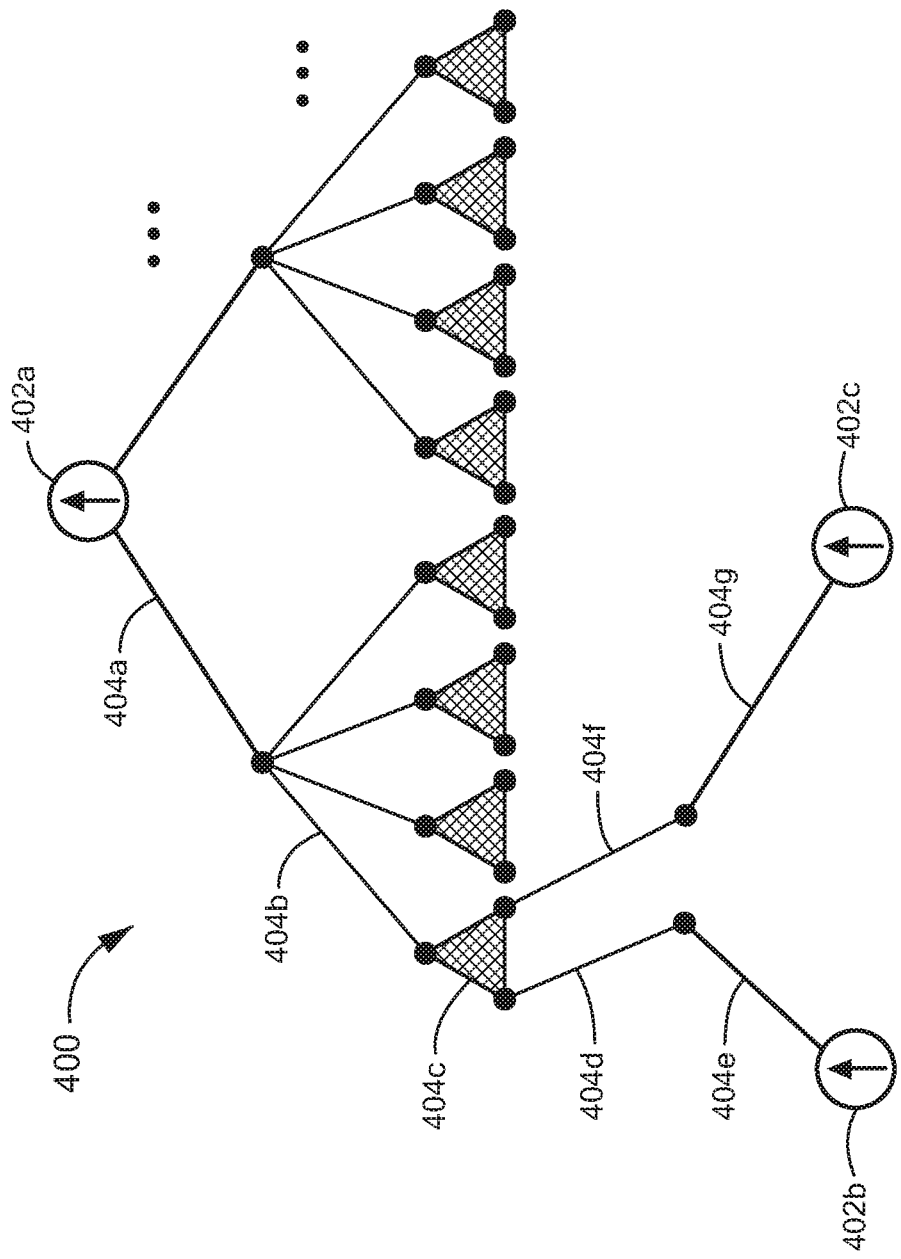
FIG. 4 is a diagram of paramagnetic tree structure to provide high-connectivity 3-spin interactions, in accordance with an embodiment of the disclosure.

FIG. 4 illustrates a paramagnetic tree structure 400 for 3-spin interactions, according to embodiments of the disclosure. Each qubit (e.g., qubit 402a) may be connected to pairs of other qubits (e.g., qubits 402b, 402c) via a series of couplers (404 generally). In the example shown, a qubit may be connected to other qubits via a series of five (5) couplers 404. For example, a first qubit 402a may be connected to a second qubit 402b via coupler series 404a, 404b, 404c, 404d, and 404e and to a third qubit 402c via coupler series 404a, 404b, 404c, 404f, and 404g, as shown. Thus, the three qubits 402a, 402b, and 402c are jointly connected via coupler 404c, which may be provided as a 3-spin coupler. It should be understood that, to promote clarity in the figure, not all qubits or all couplers are shown in FIG. 4.

Referring to FIG. 5, a structure 500 can provide a fully connected 6-qubit cluster with 3-spin interactions, according to an embodiment of the disclosure. The structure 500 includes a plurality of qubits 502a-502f (502 generally) connected via couplers (504 generally). In the embodiment shown, every qubit 502 is connected to every possible pair of other qubits, in each case via a series of five (5) couplers 504, and every combination of three (3) qubits 502 is interconnected. For example, a first qubit 502a is connected to a second qubit 502b via coupler series 504a, 504b, 504c, 504d, 504e and to a third qubit 502c via coupler series 504a, 504b, 504c, 504e, 504f, 504g. The triangular elements in FIG. 5 (e.g., element 504c) may be provided as 3-spin couplers.

Figure 6:
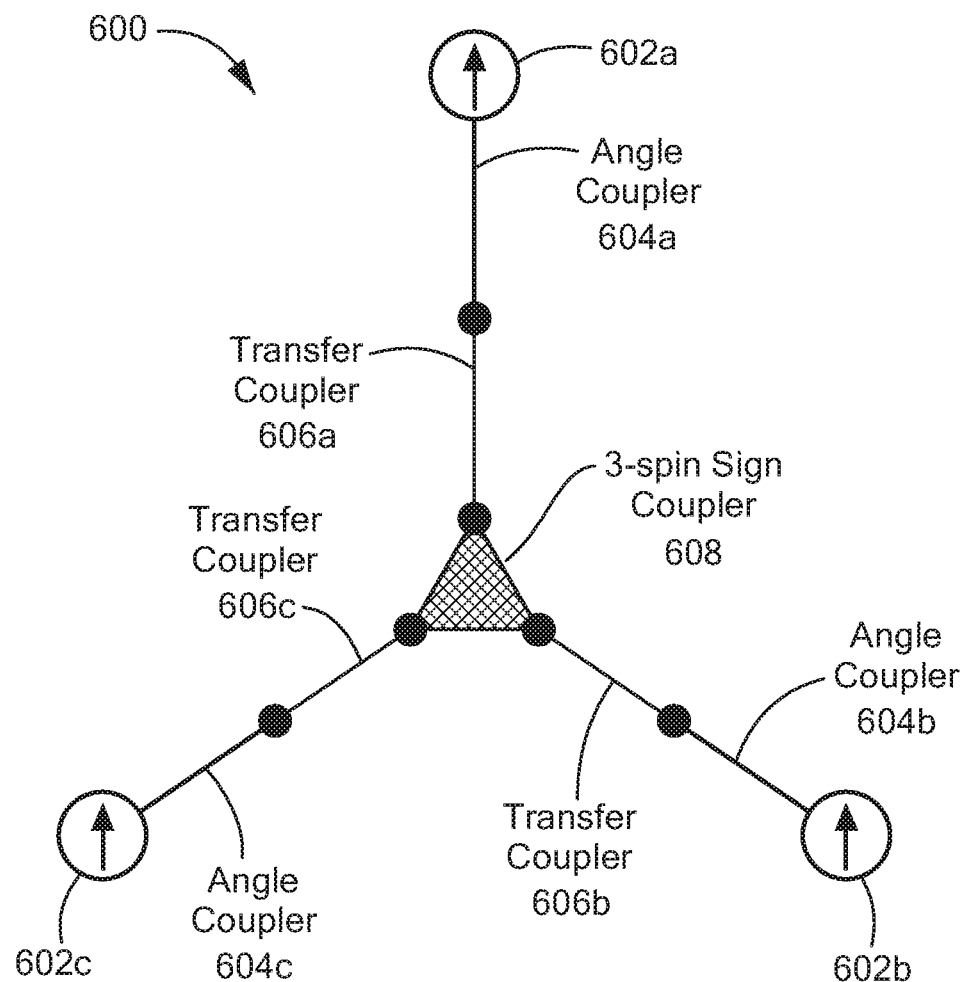
FIG. 6 is a diagram showing an arrangement of couplers for interconnecting three qubits, according to some embodiments.

FIG. 6 illustrates an arrangement 600 of couplers for interconnecting three qubits 602a-602c, according to some embodiments of the disclosure. The arrangement 600 may be used, for example, within the paramagnetic tree structure 400 of FIG. 4 and/or the paramagnetic tree structure 500 in FIG. 5. Each of the three qubits 602a, 602b, 602c (602 generally) is coupled to a respective angle coupler 604a, 604b, 604c (604 generally), which are in turn connected to respective transfer couplers 606a, 606b, 606c (606 generally), which are each connected to a sign coupler 608, as shown. The sign coupler 608 controls an independent 3-spin coupling.

Figure 6A:
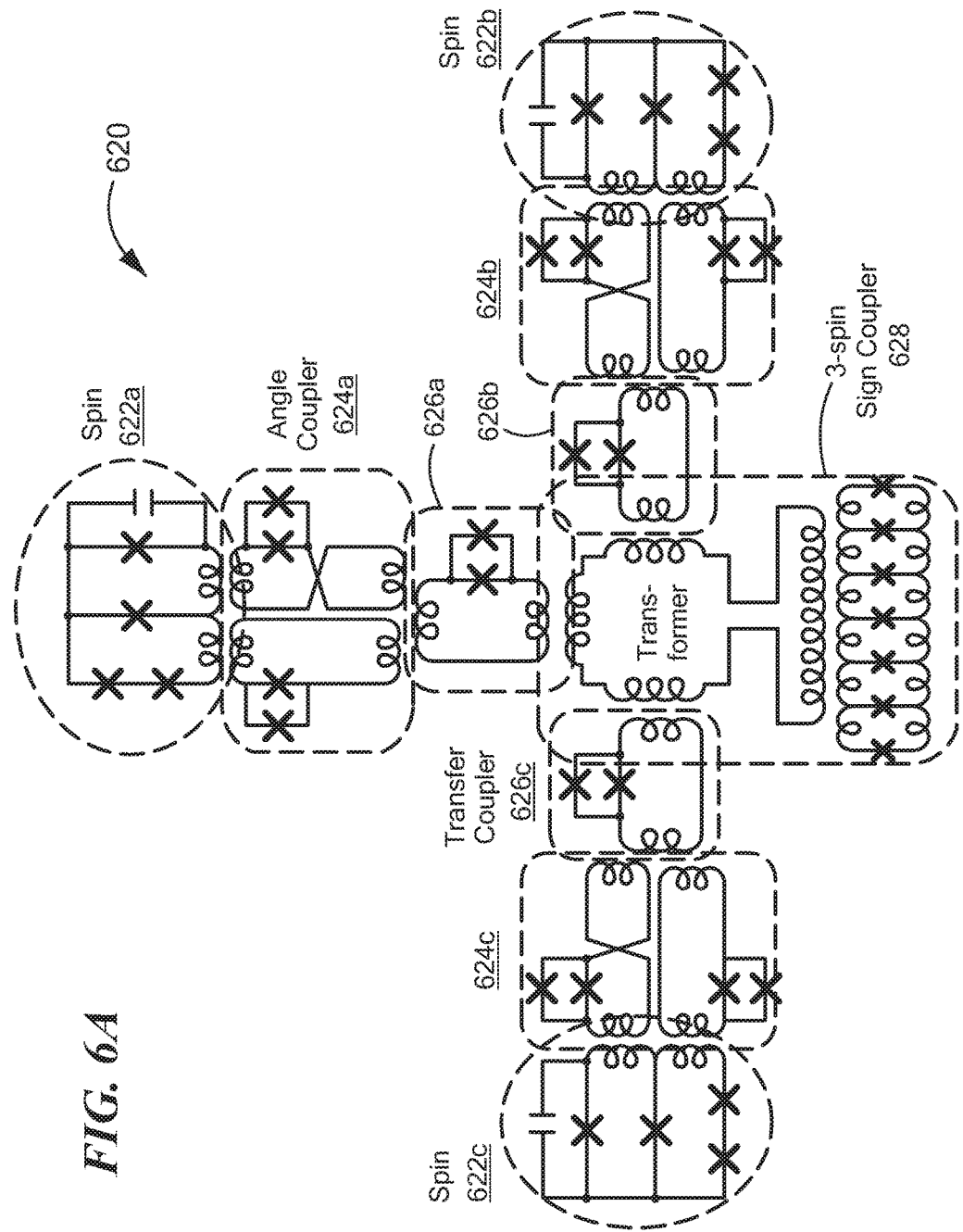
FIG. 6A is a diagram showing an arrangement of couplers for interconnecting three qubits, according to one embodiment.

In certain embodiments, qubits 602, angle couplers 604, transfer couplers 606, and/or sign coupler 608 may be the same as or similar to elements 622, 624, 626, and 628, respectively, of FIG. 6A. In some embodiments, the 3-spin sign coupler 608 may be provided using a multiloop superconducting quantum interference device (mSQUID) as described in the aforementioned U.S. patent application Ser. No. 15/354,275. It will be appreciated that an mSQUID could also be used within paramagnetic tree structures having higher numbers of multiqubit interactions, such as 4-or-more qubit interactions.

Referring to FIG. 6A, according to one embodiment, three qubits 622a-622c may be interconnected using an arrangement 620 of couplers provided from the circuit elements shown. The coupler arrangement 620 include angle couplers 624a-624c (624 generally), transfer couplers 626a-626c (626 generally), and a 3-spin sign coupler 628.

Figure 7:
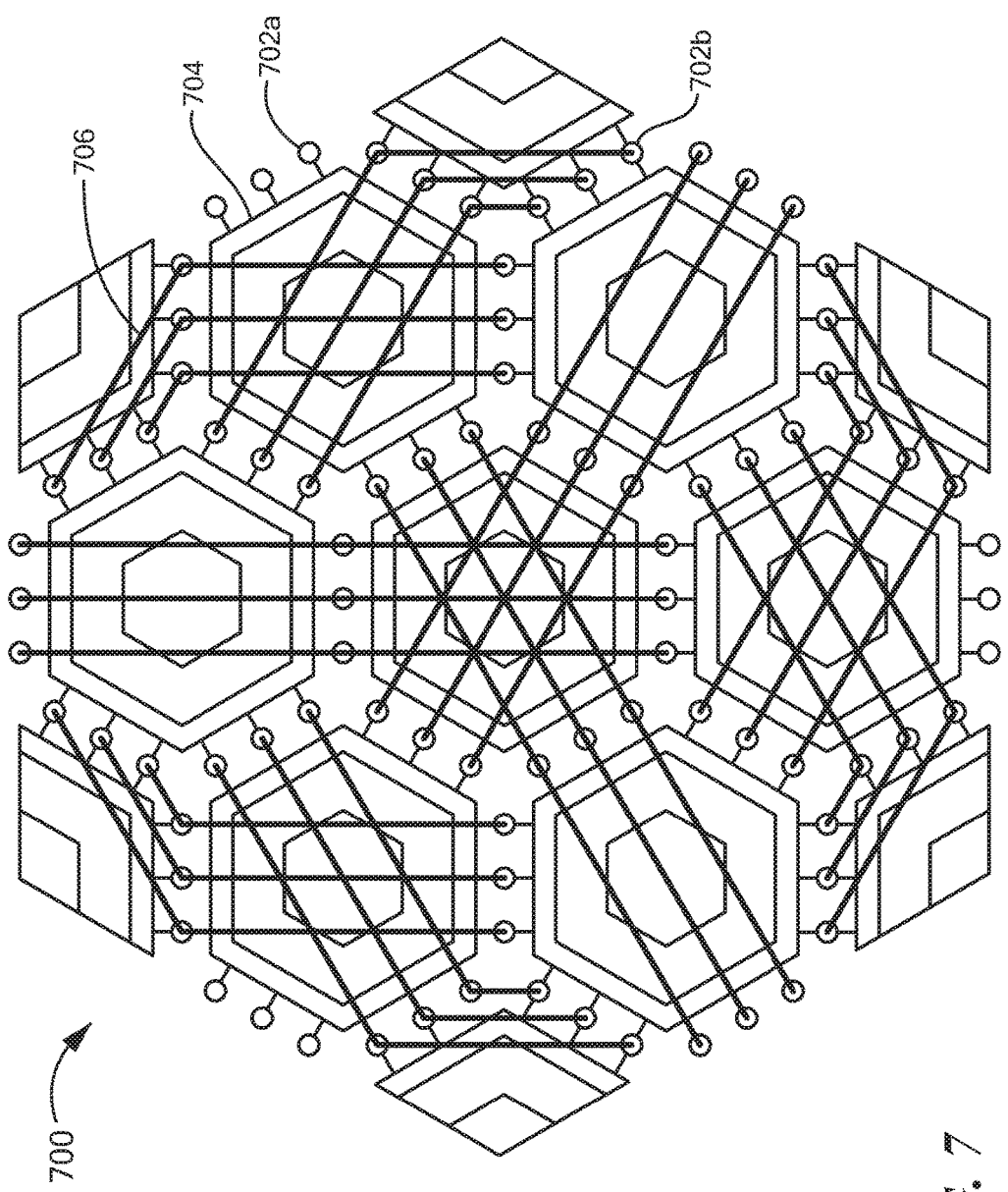
FIG. 7 is a diagram showing how paramagnetic tree structures can be combined with embedding techniques.

FIG. 7 illustrates how paramagnetic tree structures can be combined with embedding techniques to provide even greater qubit connectivity, according to some embodiments. In the figure, circular elements (e.g., element 702a) correspond to qubits and hexagonal elements (e.g., element 704) correspond to fully connected paramagnetic tree structures (or "clusters"). In the example shown, the elements 704 may correspond to 18-qubit fully connected clusters. Each qubit (702 generally) may be coupled to a single cluster 704, as with qubit 702a the example shown, or to multiple clusters 704, as with qubit 702b.

The lines labeled 706 indicate strong ferromagnetic couplings between constituent physical spins. The resulting chains indicated by these lines are the logical spins resulting from this embedding. The fully-connected logical couplings between these logical spins are not shown directly but contained in the solid hexagonal regions. It will be appreciated that in the example of FIG. 7, each pair of logical spins share overlap with at least one cluster 704, meaning that there is at least one physical connection available between them.

It is appreciated that the concepts, structures, and techniques described herein may be used to provide high-order qubit interactions and, as such, could have transformational importance in both quantum annealing and in digital quantum information processing.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A structure for providing connected qubit interaction, the structure comprising:
   a plurality of qubits; and
   for the plurality of qubits, a paramagnetic medium connecting at least one of the plurality of qubits to at least one other one of the plurality of qubits, where the paramagnetic medium includes a series of inductive quantum spin couplers arranged in a paramagnetic tree structure, wherein the series of inductive couplers includes two or more angle couplers, two or more transfer couplers, and at least one sign coupler.

2. The structure of claim 1 wherein the plurality of qubits includes at least 9 qubits.

3. The structure of claim 1 wherein the plurality of qubits includes at least 64 qubits.

4. The structure of claim 1 wherein at least one combination of three of the plurality of qubits is interconnected.

5. A structure for providing connected qubit interaction, the structure comprising:
   a plurality of qubits; and
   for the plurality of qubits, a paramagnetic medium connecting at least one of the plurality of qubits to at least one other one of the plurality of qubits, where the paramagnetic medium includes a series of inductive quantum spin couplers arranged in a paramagnetic tree structure, wherein:
      at least one combination of three of the plurality of qubits is interconnected; and at least one combination of three of the plurality of qubits is interconnected by at least an N-spin sign coupler where N represents the number of spins and N is greater than or equal to 3.

6. The structure of claim 5 wherein the plurality of qubits includes at least 5 qubits.

7. A structure for providing connected qubit interaction, the structure comprising:
   a plurality of qubits; and
   for the plurality of qubits, a paramagnetic medium connecting at least one of the plurality of qubits to at least one other one of the plurality of qubits, where the paramagnetic medium includes a series of inductive quantum spin couplers arranged in a paramagnetic tree structure, wherein the series of couplers includes an N-spin sign coupler where N represents the number of spins and wherein said N-spin sign coupler is provided having a plurality of loops, each loop having a pair of Josephson junctions.

8. The structure of claim 7 wherein the series of inductive couplers includes five or more couplers.

9. The structure of claim 7 wherein the series of couplers includes one or more couplers having two coupler qubits arranged in parallel, wherein each of the two coupler qubits include a flux loop, wherein one of the two coupler qubits has a crossover inside its flux loop.

10. A paramagnetic tree structure for providing connected qubit interaction, the paramagnetic tree structure comprising a plurality of inductive couplers that mutually couple quantum spins of at least three qubits, wherein the plurality of inductive couplers comprises at least two of:
   an angle coupler;
   a transfer coupler; and/or
   a sign coupler.

11. The paramagnetic tree structure of claim 10, wherein the plurality of qubits includes at least 64 qubits.

12. The paramagnetic tree structure of claim 10, wherein the plurality of inductive couplers includes two or more angle couplers, two or more transfer couplers, and at least one sign coupler.

13. A paramagnetic tree structure for providing connected qubit interaction, the paramagnetic tree structure comprising a plurality of inductive couplers that mutually couple quantum spins of a plurality including at least three qubits, wherein at least one inductive coupler comprises a flux loop having a crossover.

14. A paramagnetic tree structure for providing connected qubit interaction, the paramagnetic tree structure comprising a plurality of inductive couplers that mutually couple quantum spins of a plurality including at least three qubits, wherein at least one inductive coupler comprises at least an N-spin sign coupler where N represents the number of spins and N is greater than or equal to 3.

15. A paramagnetic tree structure for providing connected qubit interaction, the paramagnetic tree structure comprising a plurality of inductive couplers that mutually couple quantum spins of at least three qubits, wherein the series of couplers includes an N-spin sign coupler where N represents the number of spins and wherein said N-spin sign coupler is provided having a plurality of loops, each loop having a pair of Josephson junctions.

* * * * *